US007925419B2

(12) United States Patent
Yamaguchi

(10) Patent No.: US 7,925,419 B2

(45) Date of Patent: Apr. 12, 2011

(54) FUEL INJECTION CONTROL SYSTEM

(75) Inventor: Kazumi Yamaguchi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 659 days.

(21) Appl. No.: 12/063,838

(22) PCT Filed: Jun. 22, 2006

(86) PCT No.: PCT/JP2006/312512

§ 371 (c)(1), (2), (4) Date: Feb. 14, 2008

(87) PCT Pub. No.: WO2007/020748

PCT Pub. Date: Feb. 22, 2007

(65) Prior Publication Data

US 2010/0170474 A1 Jul. 8, 2010

(30) Foreign Application Priority Data

Aug. 18, 2005 (JP) ................................ 2005-237358

(51) Int. Cl.
*F02D 41/08* (2006.01)
*F02D 41/30* (2006.01)
*G06F 19/00* (2011.01)

(52) U.S. Cl. .... 701/104; 701/110; 701/115; 123/339.19

(58) Field of Classification Search ............ 123/339.12, 123/339.19, 478–480, 486, 680, 674, 299, 123/300, 390, 385, 364, 672, 679, 575, 494, 123/693, 694, 445, 344, 252, 406.33; 701/101–105, 701/110, 115

See application file for complete search history.

(56) References Cited

U.S. PATENT DOCUMENTS

| | | | | |
|---|---|---|---|---|
| 4,655,188 | A * | 4/1987 | Tomisawa et al. | 123/674 |
| 4,729,359 | A * | 3/1988 | Tomisawa et al. | 123/339.12 |
| 5,265,581 | A | 11/1993 | Nagaishi | |
| 5,706,654 | A | 1/1998 | Nagai | |

(Continued)

FOREIGN PATENT DOCUMENTS

EP 1340900 A2 3/2003

(Continued)

OTHER PUBLICATIONS

International Search Report for Serial No. PCT/JP2006/312512 dated Sep. 19, 2006.

(Continued)

*Primary Examiner* — Willis R. Wolfe, Jr.
*Assistant Examiner* — Johnny H Hoang
(74) *Attorney, Agent, or Firm* — McCormick, Paulding & Huber LLP

(57) ABSTRACT

A fuel injection control system in which an appropriate command is obtained both before and after learning a correction amount. Command storage means 3 stores a command for pre-learning and a command for post-learning; the command for pre-learning is a command for a pre-learning time, which is a time before correction amount learning means 5 learns a correction amount, and a command for post-learning for a post-learning time, which is a time after the correction amount learning means 5 learns a correction amount; command injection amount determination means 4 refers to the command for pre-learning at the pre-learning time, and refers to the command for post-learning at the post-learning time.

4 Claims, 4 Drawing Sheets

U.S. PATENT DOCUMENTS

| | | | | |
|---|---|---|---|---|
| 6,694,945 | B2 * | 2/2004 | Kawaguchi et al. | 123/299 |
| 6,755,176 | B2 * | 6/2004 | Takeuchi et al. | 123/299 |
| 6,758,201 | B2 * | 7/2004 | Hosoi | 123/679 |
| 6,904,899 | B2 * | 6/2005 | Kato | 123/674 |
| 7,664,592 | B2 * | 2/2010 | Asano et al. | 701/104 |
| 7,729,845 | B2 * | 6/2010 | Iwashita et al. | 701/104 |
| 2003/0164166 | A1 * | 9/2003 | Takeuchi et al. | 123/674 |
| 2003/0233997 | A1 * | 12/2003 | Kawaguchi et al. | 123/299 |
| 2004/0267434 | A1 | 12/2004 | Asano et al. | |
| 2006/0074542 | A1 * | 4/2006 | Kikutani | 701/103 |
| 2006/0207566 | A1 * | 9/2006 | Kobayashi | 123/431 |
| 2008/0053400 | A1 * | 3/2008 | Haraguchi et al. | 123/305 |
| 2008/0103675 | A1 * | 5/2008 | Ishizuka et al. | 701/103 |
| 2008/0147297 | A1 * | 6/2008 | Nakagawa et al. | 701/103 |

FOREIGN PATENT DOCUMENTS

| | | |
|---|---|---|
| JP | 61-185631 | 8/1986 |
| JP | 4-203457 | 7/1992 |
| JP | 8-261045 | 10/1996 |
| JP | 11-006457 | 1/1999 |
| JP | 11-229930 | 8/1999 |
| JP | 2003-120363 | 4/2003 |
| JP | 2004-019629 | 1/2004 |

OTHER PUBLICATIONS

Supplementary European Search Report for EP Application No. 06 76 7170 dated Aug. 31, 2009.

* cited by examiner

| ENGINE TORQUE (N) | ENGINE SPEED (RPM) | | | | |
|---|---|---|---|---|---|
| | | 0 | 100 | 500 | 1000 |
| | 0 | 1 | 1 | 1 | |
| | 10 | 1 | 1 | 1 | |
| | 20 | 1 | 1 | 1 | |
| | 30 | | | | |

FIG. 2a

| ENGINE TORQUE (N) | ENGINE SPEED (RPM) | | | | |
|---|---|---|---|---|---|
| | | 0 | 100 | 500 | 1000 |
| | 0 | 1 | 1 | 1 | 1 |
| | 10 | 1 | 2 | 2 | 3 |
| | 20 | 1 | 2 | 3 | 3 |
| | 30 | 1 | 2 | 3 | 3 |

FIG. 2b

FUEL INJECTION CONTROL SYSTEM

CROSS REFERENCE TO RELATED APPLICATIONS

This application is entitled to the benefit of and incorporates by reference essential subject matter disclosed in International Patent Application No. PCT/JP2006/312512 filed on Jun. 22, 2006 and Japanese Patent Application No. 2005-237358 filed Aug. 18, 2005.

TECHNICAL FIELD

The present invention relates to a fuel injection control system for a multi-injection system and more specifically relates to a fuel injection control system in which an appropriate command is obtained both before and after learning a correction amount.

BACKGROUND OF THE INVENTION

When each cylinder of a diesel engine is provided with fuel injection means and injection amount is controlled by controlling the energizing time of the fuel injection means, a fuel injection control system determines the command injection amount and the injection frequency with which the fuel injection means is to inject on the basis of the current engine control parameters. At this time, in order to mitigate the complexity of calculations, usually the command injection amounts with which the fuel injection means is to inject corresponding to the engine control parameters are stored in command storage means referred to as a map. The command injection amount with which the fuel injection means is to inject corresponding to the engine control parameters is stored in the map. If the map is referred to on the basis of the engine control parameters, a command injection amount is obtained.

The fuel injection control system does not inject the total amount of the command injection amount which is to be injected all at once in a single combustion cycle, but rather performs auxiliary injections which are referred to as pilot injections or after injections, an appropriate number of times before or after a main injection. This is called multi-injection. In multi-injection, a command injection amount is injected divided into a plurality of times. Command storage means in which this injection pattern (command injection amount and injection frequency) is mapped is referred to as a multi-injection pattern map.

The command injection amount is provided using energizing time according to the basic principal that injection amount is proportional to energizing time. However, in reality there are variations (individual differences) in the ratio of injection amount and energizing time for each individual fuel injection means, and therefore it is necessary to correct for each cylinder the actual injection amount injected by the fuel injection means to correspond with the command injection amount.

The required correction amount differs with each individual fuel injection means, however the required correction amount for the same individual fuel injection means does not change drastically within a short period of time. Therefore, conventionally, the correction amount relative to the command injection amount is learnt so the actual injection amount actually injected by the fuel injection means corresponds with the command injection amount, and the command injection amount is corrected using this learned correction amount after learning. The command injection amount is provided using energizing time, and thereby the correction amount is also provided using an energizing correction time for shortening and lengthening the energizing time of the command injection amount.

The learned correction amount is stored in a nonvolatile memory. As a result of this, the learned correction amount is maintained also after power is turned off, and as such the next time power is turned on, the stored correction amount can be used without relearning.

Also, when idling, in order to adjust the engine speed at which the engine is actually currently rotating (hereafter referred to as actual engine speed) to the engine speed targeted by the fuel injection control system (hereafter referred to as target engine speed), the fuel injection control system determines a feedback amount by multiplying the deviation of the target engine speed and the actual engine speed by a proportionality factor (hereafter referred to as idle feedback factor), and superposes this feedback amount on the command injection amount to make a correction to the target engine speed so as to bring the actual engine speed closer to the target engine speed.

DISCLOSURE OF THE INVENTION

In the conventional fuel injection control system, an idle feedback factor and a multi-injection pattern map are the same before and after learning a correction amount. However, the idle feedback factor and the multi-injection pattern map are, as a matter of course, produced with a state on the presumption in which injection can be carried out accurately (a state in which the actual injection amount corresponds to the command injection amount). That is, the idle feedback factor and the multi-injection pattern map correspond to a post-learning state. Accordingly, the idle feedback factor and the multi-injection pattern map are the same before and after learning a correction amount, meaning that before learning which is a state in which injection cannot take place accurately (i.e., a state in which the actual injection amount does not correspond with the command injection amount), an idle feedback factor and a multi-injection pattern map based on post-learning are being used.

Conventionally, due to this, idle hunting and variations between cylinders are caused. When idling hunting and variations between cylinders occur, learning can no longer take place.

Conversely, even if an idle feedback factor and a multi-injection pattern map adjusted to a pre-learning state in which the injection cannot be carried out accurately are produced, if this kind of idle feedback factor and multi-injection pattern map are used post-learning in a state in which injection can take place accurately, the act of learning would be made practically meaningless.

Moreover, if an extremely large feedback amount is given during idling, there are instances in which the engine stops or oscillates (engine speed varies and does not stabilize). On the other hand, if a feedback amount is too small, it takes time for the engine speed to stabilize at the target value.

Also, while it was previously described that the required correction amount for the same individual fuel injection means does not change drastically within a short period of time, it can be assumed that over the long life span and such of the fuel injection means, the condition of the fuel injection means does change. As such, if the learned correction amount is stored in a nonvolatile memory and used continuously, there are instances in which the condition of the fuel injection means and the correction amount cease to match.

An object of the present invention is to solve the above-described problems, and provide a fuel injection control system in which an appropriate command is obtained both before and after learning a correction amount.

In order to achieve the above object the present invention is a fuel injection control system comprising command storage means for storing a command injection amount and an injection frequency with which fuel injection means is to perform injection corresponding to engine control parameters; command injection amount determination means for determining the command injection amount and the injection frequency by referring to the command storage means on the basis of current engine control parameters; and correction amount learning means for learning a correction amount relative to the command injection amount so that the actual amount of injection performed actually by the fuel injection means corresponds with the command injection amount; wherein the command storage means stores a command for pre-learning for a pre-learning time which is a time before the correction amount learning means learns a correction amount, and a command for post-learning for a post-learning time which is a time after the correction amount learning means learns a correction amount; and the command injection amount determination means refers to the command for pre-learning at the pre-learning time, and refers to the command for post-learning at the post-learning time.

The average injection frequency of the command for pre-learning relative to the same engine control parameters may be of a small value compared to that of the average injection frequency of the command for post-learning.

The fuel injection system may further comprise idle feedback means for, when idling, comparing a target engine speed which is targeted and an actual engine speed, determining a feedback amount by multiplying this deviation by a proportionality factor, and superposing this feedback amount on the command injection amount, to bring the actual engine speed closer to the target engine speed; and furthermore this idle feedback means stores a proportionality factor for pre-learning for the pre-learning time and a proportionality factor for post-learning for the post-learning time larger than said proportionality factor for pre-learning, and determines the feedback amount using the proportionality factor for pre-learning at the pre-learning time, and using the proportionality factor for post-learning at the post-learning time.

The correction amount learning means, when learning is completed, may store in the memory the learned correction amount and data showing whether the learning is accomplished, and, when determining that the learning is accomplished, may on the basis of this data showing whether the learning is accomplished, not perform learning. The command injection amount determination means may determine whether it is the pre-learning time or the post-learning time on the basis of this data showing whether the learning is accomplished. The fuel injection control system may further comprise a relearning determination means for determining whether a relearning condition set in advance has been met, and may be provided with pre-learning state returning means for returning the correction amount learning means and the command injection amount determination means to the state of the pre-learning time by resetting the data showing whether the learning is accomplished to the state of pre-learning, when the relearning determination means determines the relearning condition has been met.

The present invention exhibits the following superior effects.

(1) An appropriate command is obtained both before and after learning a correction amount.

BRIEF DESCRIPTION OF THE DRAWINGS

FIG. 2 is a drawing showing a specific example of command storage means used in the present invention, in which (a) is a drawing of a pre-learning map, and (b) is a drawing of a post-learning map.

DETAILED DESCRIPTION OF THE PREFERRED EMBODIMENTS

Below, one embodiment of the present invention will be discussed in detail on the basis of the attached drawings.

Figure 1:
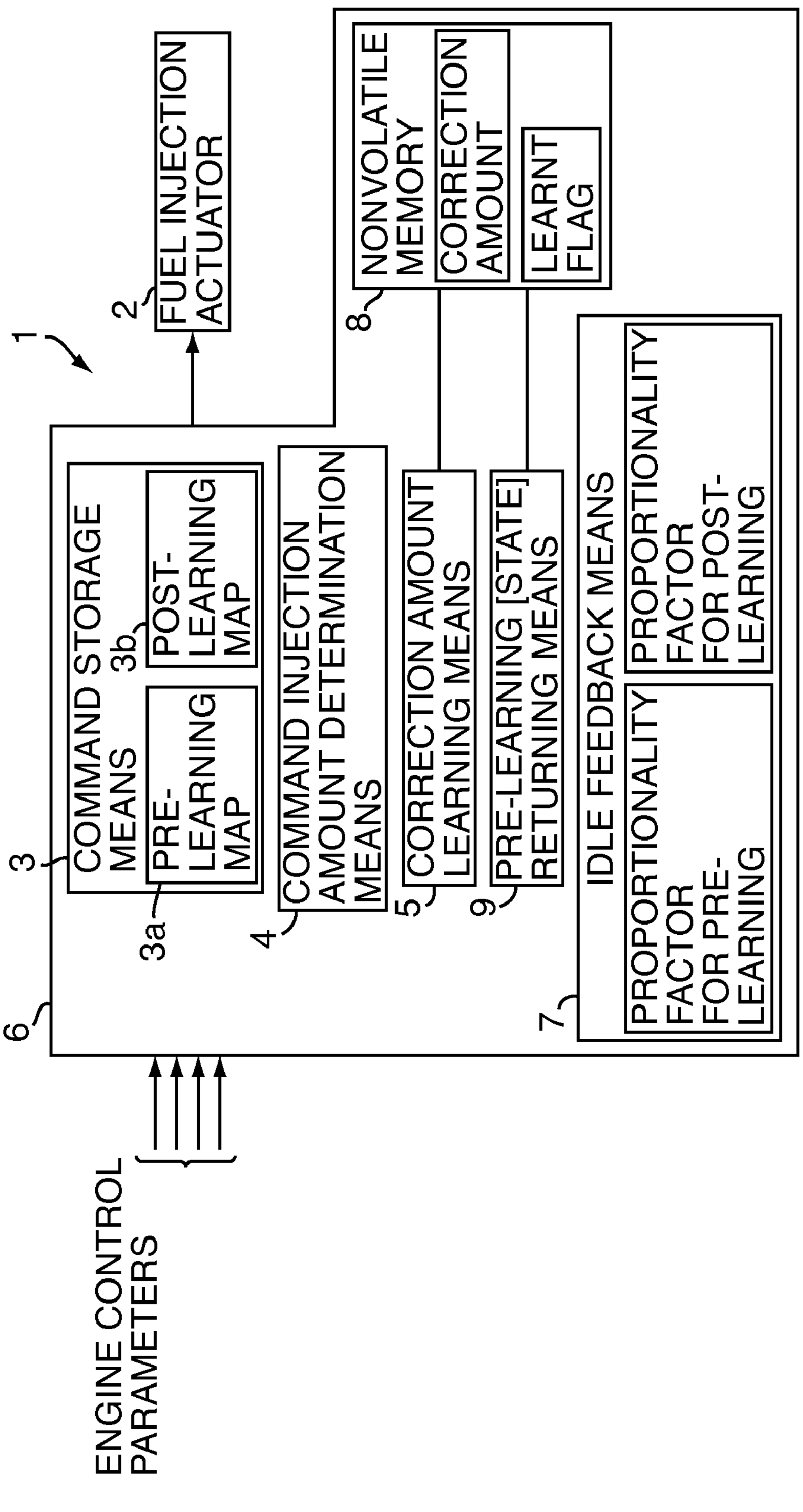
FIG. 1 is a block diagram of a fuel injection control system showing one embodiment of the present invention.

As is shown in FIG. 1, a fuel injection control system 1 according to the present invention comprises command storage means 3 for storing a command injection amount and an injection frequency with which fuel injection means 2 is to perform injection during a combustion cycle corresponding to engine control parameters; command injection amount determination means 4 for determining a command injection amount and an injection frequency by referring to the command storage means 3 on the basis of the current engine control parameters; and correction amount learning means 5 for learning a correction amount relative to the command injection amount such that the actual injection amount performed actually by the fuel injection means 2 corresponds with the command injection amount; wherein the command storage means 3 stores a command for pre-learning for a pre-learning time which is a time before the correction amount learning means 5 learns a correction amount, and a command for post-learning for a post-learning time which is a time after the correction amount learning means 5 learns a correction amount; and the command injection amount determination means 4 refers to the command for pre-learning at the pre-learning time, and refers to the command for post-learning at the post-learning time.

For engine control parameters, a combination of any number of well-known numerical quantities conventionally input into a fuel injection control system 1, such as engine speed, engine torque, accelerator opening, air fuel ratio, exhaust gas recirculation amount and so on may be used. However, here, for the sake of simplicity, only engine speed and torque will be used to illustrate the present invention.

For the fuel injection means 2, a variety of fuel injection means may be used in which injection amount is substantially proportional to energizing time. However, here, fuel injection means is configured from a solenoid injector which opens and closes an injection nozzle valve using a solenoid.

The correction amount learning means 5 is a well-known means which, with regard to an injection cylinder shown by a cam angle sensor (not shown in drawings), compares the command injection amount which the command injection amount determination means 4 outputs to the fuel injection means 2 and the engine speed of this injection cylinder shown by an engine speed sensor (not shown in drawings), can estimate the excess or deficiency of the actual injection amount in the fuel injection means 2, and can calculate a correction amount.

The command storage means 3, the command injection amount determination means 4, the correction amount learning means 5, and idle feedback means 7 and pre-learning state returning means 9 both to be described later on, are implemented by means of a software in a computer used for engine control referred to as an ECU 6.

The command storage means 3 is divided into a pre-learning map 3*a* for storing commands for pre-learning, and a post-learning map 3*b* for storing commands for post-learning. Each map has a multi-injection pattern map for storing command injection amounts, injection frequencies, injection amount patterns, injection timings, and injection intervals. However, for the sake of simplicity, only injection frequency will be used to illustrate the present invention.

This fuel injection control system 1 has idle feedback means 7 for, when idling, comparing a target engine speed and an actual engine speed, determining a feedback amount by multiplying this difference by a proportionality factor (idle feedback factor), and superposing this feedback amount on the command injection amount, to bring the actual engine speed closer to the target engine speed; and furthermore this idle feedback means 7 stores a comparatively small proportionality factor for pre-learning for the pre-learning time and a comparatively large proportionality factor for post-learning for the post-learning time, and determines the feedback amount using the proportionality factor for pre-learning at the pre-learning time, and the proportionality factor for post-learning at the post-learning time.

In this fuel injection control system 1, when learning is completed the correction amount learning means 5 stores the learned correction amount in a nonvolatile memory 8, along with storing data showing that the learning is accomplished (a learnt flag, for example) in the nonvolatile memory 8, and does not perform learning while this flag is maintained; and the command injection amount determination means 4 and the idle feedback means 7 use this learnt flag to determine if it is the pre-learning time or the post-learning time. A method for storing whether or not the learning is accomplished as data is not limited to this learnt flag. When a learning value is expressed as a two digit hexadecimal number, in a state in which learning has not yet taken place the learning value "FF" expresses the fact that learning has not yet taken place, and when the learning value is read and the value is "FF", it can be determined that learning has not yet taken place. In this method, the learnt flag is not required and thereby memory space can be conserved.

Also, this fuel injection control system 1 comprises relearning determination means (not shown in the drawings) for determining whether a relearning condition set in advance has been satisfied, and pre-learning state returning means 9 is provided for returning the correction amount learning means 5 and the command injection amount determination means 4 to the state of the pre-learning by resetting the data showing whether the learning is accomplished to the state of the pre-learning, when the relearning determination means determines the relearning condition has been satisfied.

The nonvolatile memory 8 can be configured from an EEPROM, a flash memory, or similar.

In FIG. 2(*a*), a pre-learning map is shown and, in FIG. 2(*b*), a post-learning map is shown. As the drawings show, in both maps, the engine control parameters are set to engine speed and engine torque only, and thereby each map can be expressed two dimensionally. Referring to a section lying in a column of a desired engine speed (rpm) in a row of a desired engine torque (N), the injection frequency (frequency) written in this section can be read. When the engine torque or the engine speed is of a value in between the values shown in the rows and columns of these maps, the injection frequency may be determined by either referring to the map after rounding-off the engine torque or the engine speed to a value of a row or a column of the map, or by approximating from the values of sections on both of the sides sandwiching the engine torque or the engine speed.

When comparing the same sections of the two maps, the injection frequencies of the pre-learning map are smaller or equal to the injection frequencies of the post-learning map. In other words, the injection frequency of the command for pre-learning is of a small value compared to that of the injection frequency of the command for post-learning relative to the same engine control parameters. That is to say, the average value of the injection amount in the map, more specifically, the average value of the injection frequency of the map at the time learning takes place during normal operation, is smaller than the average value of the injection frequency of the post-learning map. The reason for this will be explained by way of example.

Assume an engine has an amount of exhaust of 1700 $cm^3$. The required injection amount for a single combustion cycle for one cylinder when idling is 4 $mm^3$. Before learning, injection is not performed accurately (the actual injection amount does not correspond to the command injection amount). Also, suppose there is an individual fuel injection means serving as the fuel injection means 2, which has an actual injection amount of 1 $mm^3$ more than the command injection amount per one injection. If this fuel injection means 2 injects three times, that makes a total of 3 $mm^3$ in excess. That is, the total actual injection amount in a single combustion cycle is 3 $mm^3$ more than the command injection amount. When compared to the command injection amount of 4 $mm^3$, this excess is quite a large amount, and thus idling cannot be sustained. Conversely, in an individual fuel injection means in which the injection amount per one injection is too small, the total actual injection amount of a single combustion cycle becomes very small, and also, there are cases in which idling cannot be sustained.

In response to this, in the present invention, the pre-learning injection frequency is set small. For example, in the previous example, if injection is set to only occur once, the total actual injection amount for a single combustion cycle would only be 1 $mm^3$ more than that of the command injection amount. Therefore, idling can be sustained. As idling can be sustained, learning of the correction amount can take place when idling.

However, as injection can be carried out accurately (actual injection amount corresponds to command injection amount) after learning, no matter how many times injection takes place in a single combustion cycle, an increase in inaccuracy will not occur. Therefore, by increasing the injection frequency also when idling, it is possible for multi-injection, which is the original goal, to take place.

Figure 3:
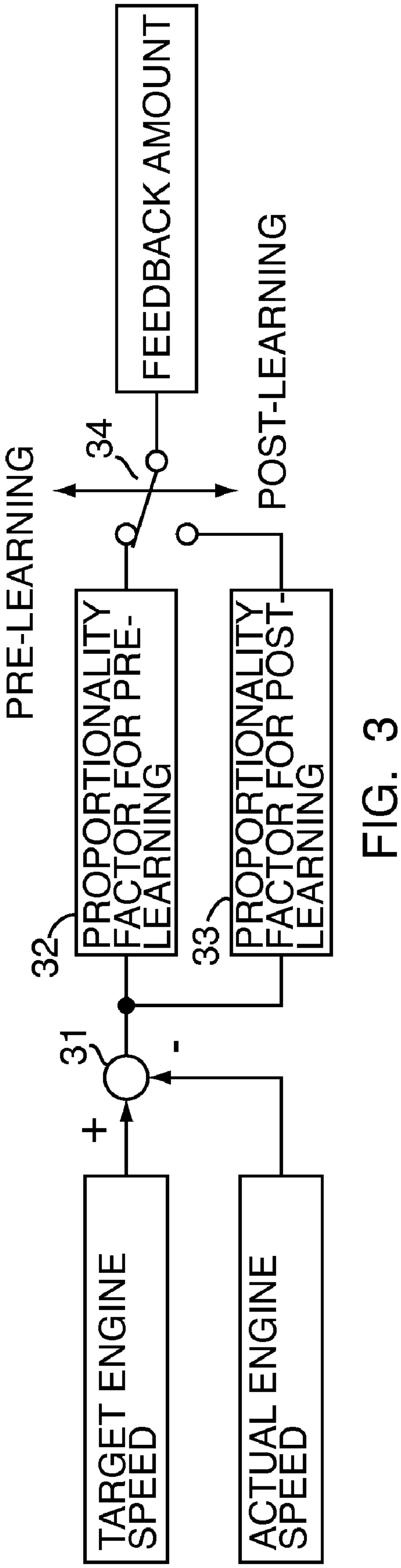
FIG. 3 is an equivalent circuit schematic of a feedback amount determination operation performed by idle feedback means used in the present invention.

FIG. 3 shows an equivalent circuit of a feedback amount determination operation performed by the idle feedback means 7. This equivalent circuit is configured from a comparator 31 for comparing the target engine speed and the actual engine speed, a pre-learning factor unit 32 for storing a proportionality factor for pre-learning, a post-learning factor unit 33 for storing a proportionality factor for post-learning, and a switch 34 for switching between the values read from these two memory units before and after learning, and outputting as feedback amount.

The proportionality factor for pre-learning is comparatively small relative to the proportionality factor for post-learning which is comparatively large. Engine stability is an important consideration, therefore, a relatively small pre-learning proportionality factor is desirable because it prevents the engine from stopping while idling during pre-learning. If a proportionality factor is large, when the deviation between the target engine speed and the actual engine speed is large, the feedback amount becomes extremely large, and the engine may be caused to stop, however, if the proportionality factor is small, this can be avoided.

It is also important that the injection amount during idling be an optimum injection amount, so as to cause the engine speed to quickly converge upon the ultimately targeted idling speed after learning. When the proportionality factor is small, the amount of feedback relative to the difference between the target engine speed and the actual engine speed does not become very large, and thereby convergence is accomplished late, however, by making the proportionality factor large, convergence can be accomplished sooner.

Figure 4:
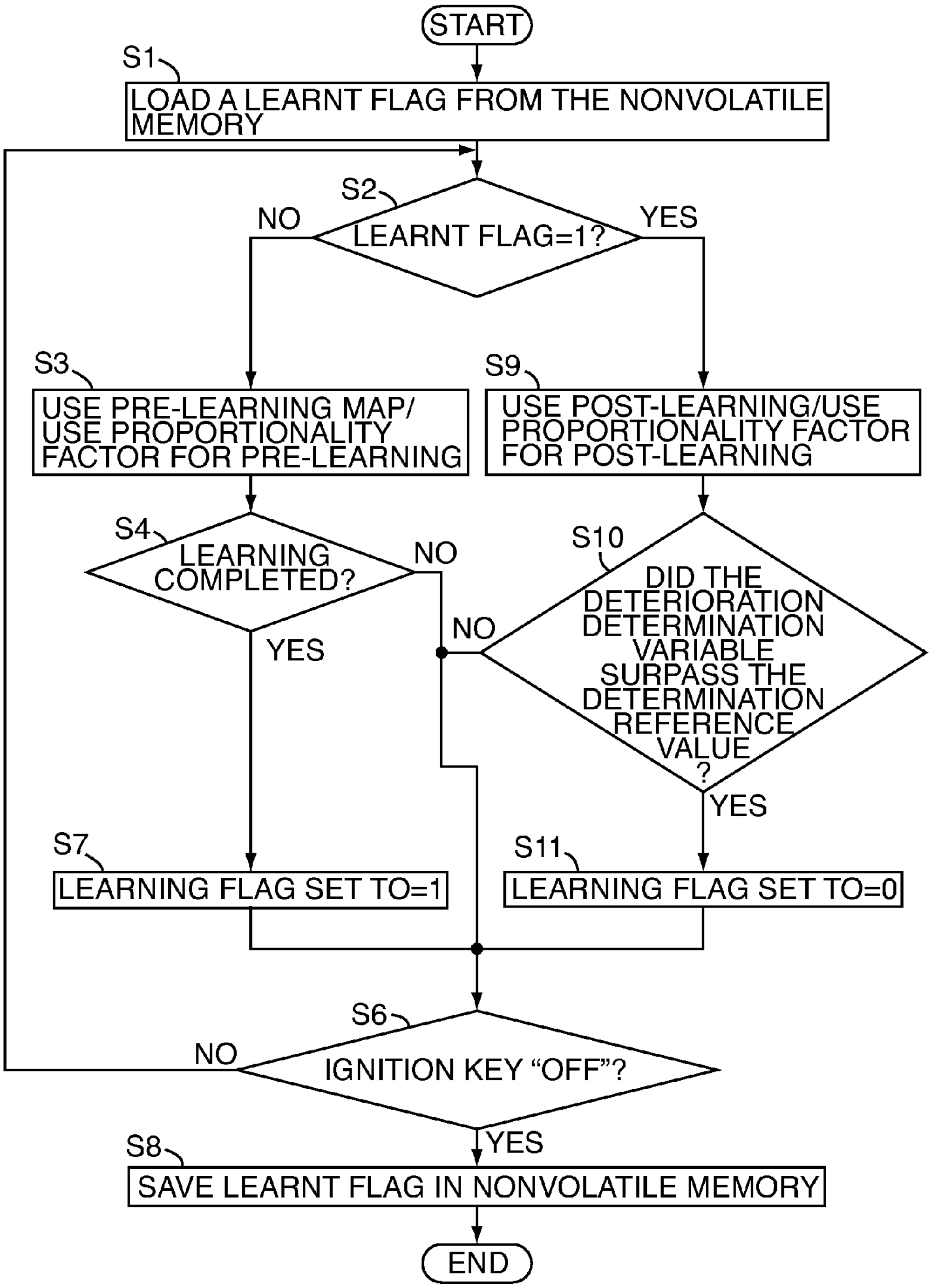
FIG. 4 is a flowchart showing the flow of control in the fuel injection control system of the present invention.

The flow of control is shown in FIG. 4. Below the operation of the fuel injection control system will be explained according to this flow.

The flow of this control starts with the turning on of the power (ignition key is "on"). After starting, immediately in Step 51, the ECU 6 reads the learnt flag stored in the nonvolatile memory 8, and stores this in the working area in the ECU 6. Please note, at the time of shipping the ECU 6, the learnt flag equals 0 (clear).

In Step S2, the ECU 6 judges whether or not the learnt flag equals 1 (whether or not learning has taken place). If NO, it means it is pre-learning time at present. If YES, it means it is post-learning time at present.

If it is pre-learning time, in Step S3, the command injection amount determination means 4 determines the command injection amount and the injection frequency by referring to the pre-learning map. Also, at this time, if during idling, the idle feedback means 7 determines the feedback amount using the proportionality factor for pre-learning, and calculates the target engine speed. That is to say, a command injection amount is calculated using an idle feedback factor or a multi-injection pattern map optimized in a state in which a pre-learning injection cannot take place accurately (a state in which the actual injection amount does not correspond with the command injection amount), and a correction amount relative to the command injection amount is calculated.

In Step S4, the ECU 6 judges whether or not learning by the correction amount learning means 5 is completed. If the judgment is NO, the flow of this control proceeds to Step S6.

The correction amount learning means 5 may complete learning by setting a particular speed relative to an ideal fuel injection amount, and using the command fuel injection amount at which engine speed is stabilized at that particular speed as the ideal fuel injection amount.

For example, when the engine theoretically rotates at 700 rpm when the injection amount is 5 $mm^3$, in an instance in which an injector injects 3 $mm^3$ more than required, if the command injection amount is gradually decreased from 5 $mm^3$ during learning, the engine will stabilize at 700 rpm when the command injection amount is 2 $mm^3$. Here, as the engine stabilized at 700 rpm, by making a correction to recognize the command injection amount (energizing time and the like) as 5 $mm^3$ from this time, the gap between the actual injection amount and the command injection amount can be filled. Learning completion is determined by this engine speed stabilization.

If the judgment at Step S4 is YES, at Step S7, the learnt flag equals 1 (learning has taken place). The flow of this control then proceeds to Step S6.

In Step S6, the ECU 6 judges whether the power is off (ignition key is "off"). When power is off, backup of the memory cannot be carried out, and therefore backup of the memory is performed at the stage when the ignition is "off." If NO, the ignition key is "on," and therefore it is understood that engine operation is continuing and the flow of this control returns to Step S2. If YES, the ignition key is "off," and therefore the engine operation was stopped. Therefore, at Step S8, the ECU 6 stores the learnt flag inside the work area in the ECU 6 in the nonvolatile memory 8, to prepare for powering off.

At Step S2 when the judgment indicates it is post-learning time, the command injection amount determination means 4 refers to the post-learning map and determines the command injection amount and the injection frequency at Step S9. Also, at this time, if during idling, the idle feedback means 7 determines the feedback amount using the proportionality factor for post-learning and calculates the target engine speed. That is to say, a command injection amount is calculated using an idle feedback factor or a multi-injection pattern map optimized in a state in which post-learning injection can take place accurately (a state in which the actual injection amount corresponds to the command injection amount), and a correction amount relative to the command injection amount is calculated.

In Step S10, judgment of deterioration of the fuel injection means 2 is carried out by the pre-learning state returning means 9. Specifically, when a deterioration determination variable surpasses a predetermined determination reference value, it is determined that the fuel injection means 2 has deteriorated (the condition has changed to such a degree that re-learning is required). An idle feedback integral term, vehicle mileage and the like are used as deterioration determination variables. Also, detection of the variation of idle speed, detection of the variation of the correction amount between cylinders and such are performed, and the magnitude of these variations may be used as a deterioration determination variable. Also, when the fuel injection means 2 is exchanged, or also when a part (a pump, an ECM or the like) having influence on the fuel injection system is exchanged, relearning is required, and therefore when these parts are exchanged, information relaying this event is saved to be input to the ECU 6, such that judgment regarding this information as well may take place at Step S10.

If the judgment of Step S10 is NO, there is no need to relearn the correction amount, and the flow of this control proceeds to Step S6. If the judgment of Step S10 is YES, there is a need to relearn the correction amount, and thereby after the learnt flag is set equal to 0 (clear) at Step S11, the flow of this control proceeds to Step S6. The effects of the learnt flag being cleared appear at Step S2, and relearning takes place.

As described above, in a state in which injection before learning the correction amount cannot take place accurately, the command injection amount is calculated using an idle feedback factor or a multi-injection pattern map optimized in this state, and the correction amount relative to this command injection amount is calculated; and conversely in a state in which injection after learning the correction amount can take place accurately, the command injection amount is calculated using an idle feedback factor or a multi-injection pattern map optimized in this state, and the correction amount relative to this command injection amount is calculated. In other words even pre-learning or post-learning, an appropriate command is obtained from the command injection amount determination means 4 and the idle feedback means 7.

The pre-learning injection frequency is set as a small value compared to that of the post-learning injection frequency, therefore the error of the actual injection amount relative to the command injection amount does not increase. Particularly, sustaining of idling is possible when idling is performed with a small command injection amount from the beginning.

The idle feedback means 7 uses a comparatively small proportionality factor for pre-learning at the pre-learning time and a comparatively large proportionality factor for post-learning at the post-learning time, therefore at the pre-learning time, stability in the engine speed is maintained, and at the post-learning time, quick convergence to the appropriate engine speed value can be expected.

The pre-learning state returning means 9 judges deterioration of the fuel injection means 2 and clears the learnt flag, thus returning controls to the pre-learning time, and thereby a correction amount corresponding to the deterioration of the fuel injection means 2 can be relearned.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A fuel injection control system, comprising: command storage means for storing a command injection amount and an injection frequency with which fuel injection means is to perform injection corresponding to engine control parameters; command injection amount determination means for determining the command injection amount and the injection frequency by referring to said command storage means on the basis of current engine control parameters; and correction amount learning means for learning a correction amount relative to the command injection amount so that the actual amount of injection performed actually by said fuel injection means corresponds with the command injection amount, wherein said command storage means stores a command for pre-learning for a pre-learning time which is a time before said correction amount learning means learns a correction amount, and a command for post-learning for a post-learning time which is a time after said correction amount learning means learns a correction amount; and said command injection amount determination means refers to the command for pre-learning at the pre-learning time, and refers to the command for post-learning at the post-learning time.

2. The fuel injection control system according to claim 1, wherein the average injection frequency of the command for pre-learning relative to the same engine control parameters is of a small value compared to that of the average injection frequency of the command for post-learning.

3. The fuel injection control system according to claim 1, further comprising idle feedback means for, when idling, comparing a target engine speed which is targeted and an actual engine speed, determining a feedback amount by multiplying this deviation by a proportionality factor, and superposing this feedback amount on the command injection amount, to bring the actual engine speed closer to the target engine speed, wherein said idle feedback means stores a proportionality factor for pre-learning for the pre-learning time and a proportionality factor for post-learning for post-learning time that is larger than said proportionality factor for pre-learning, and determines the feedback amount using the proportionality factor for pre-learning at the pre-learning time, and using the proportionality factor for post-learning at the post-learning time.

4. The fuel injection control system according to claim 1, wherein said correction amount learning means, when learning is completed, stores in a memory the learned correction amount and data showing whether or not the learning is accomplished, and does not perform learning when determining that the learning is accomplished on the basis of this data showing whether or not the learning is accomplished; and said command injection amount determination means distinguishes the pre-learning time from the post-learning time on the basis of this data showing whether or not the learning is accomplished; and the fuel injection control system further comprises relearning determination means for determining whether or not a relearning condition set in advance has been satisfied, and pre-learning state returning means for returning said correction amount learning means and said command injection amount determination means to the state of the pre-learning by resetting said data showing whether or not the learning is accomplished to the state of pre-learning, when said relearning determination means determines the relearning condition has been satisfied.

* * * * *